US007780888B2

(12) United States Patent
van der Werff et al.

(10) Patent No.: US 7,780,888 B2
(45) Date of Patent: Aug. 24, 2010

(54) PROCESS FOR MAKING A CARBON NANOTUBES/ULTRA-HIGH MOLAR MASS POLYETHYLENE COMPOSITE FIBRE

(75) Inventors: Harm van der Werff, Bunde (NL); Shilun Ruan, Hkust (HK); Tongxi Yu, Ma On Shan (HK); Ping Gao, Saikung (HK); Roelef Marissen, Born (NL)

(73) Assignee: DSM IP Assets B.V., Heerlen (NL)

( * ) Notice: Subject to any disclaimer, the term of this patent is extended or adjusted under 35 U.S.C. 154(b) by 132 days.

(21) Appl. No.: 11/658,155

(22) PCT Filed: Jul. 14, 2005

(86) PCT No.: PCT/EP2005/007816

§ 371 (c)(1),
(2), (4) Date: Aug. 21, 2007

(87) PCT Pub. No.: WO2006/010521

PCT Pub. Date: Feb. 2, 2006

(65) Prior Publication Data

US 2008/0145301 A1 Jun. 19, 2008

(30) Foreign Application Priority Data

Jul. 27, 2004 (EP) .................................. 04077162

(51) Int. Cl.
*D01F 6/00* (2006.01)
*C08K 3/02* (2006.01)
(52) U.S. Cl. ........................................ 264/184; 524/80
(58) Field of Classification Search ................ 264/184; 524/80
See application file for complete search history.

(56) References Cited

U.S. PATENT DOCUMENTS 3,173,878 A * 3/1965 Reyes .......................... 430/138
5,430,119 A * 7/1995 Kouya et al. ................ 526/348.1
6,303,181 B1 * 10/2001 Thorn et al. ................ 427/98.1
2001/0010809 A1 8/2001 Haddon et al.
2005/0186378 A1 * 8/2005 Bhatt ........................... 428/36.9
2005/0266605 A1 * 12/2005 Kawakami .................. 438/99
2007/0213450 A1 * 9/2007 Winey et al. ................ 524/495

FOREIGN PATENT DOCUMENTS

WO WO 01/92381 A1 12/2001
WO WO 03/069032 A1 8/2003

OTHER PUBLICATIONS

Dispersion and Alignment of Carbon Nanotubes in Polymer Matrix: A Review Xiao-Lin Xie et. al Materials Science and Engineering R 49 (2005) 89-112.*

* cited by examiner

*Primary Examiner*—Joseph S Del Sole
*Assistant Examiner*—David N Brown, II
(74) *Attorney, Agent, or Firm*—Nixon & Vanderhye P.C.

(57) ABSTRACT

The invention relates to a process for making a carbon nanotubes/ultra-high molar mass polyethylene (CNTs/UHPE) composite fiber comprising the steps of a) pre-treating CNTs with an acidic aqueous solution; b) making a composition containing pre-treated CNTs dispersed in a solution of UHPE in a spin solvent; and c) spinning the composition obtained into fibers; wherein step b) comprises making a dispersion of pre-treated CNTs in an alcohol, and mixing this dispersion with a mixture of UHPE and spin solvent. With this process CNTs/UHPE composite fibers showing improved tensile properties are obtained at relatively low CNTs content. A further advantage is that no or hardly any additional components, like dispersion aids, need to be added to make a stable dispersion of CNTs in the spin composition. The invention also relates to a CNTs/UHPE composite fiber obtainable by the process according to the invention, and to semi-finished or end-use articles containing said composite fiber.

14 Claims, No Drawings

PROCESS FOR MAKING A CARBON NANOTUBES/ULTRA-HIGH MOLAR MASS POLYETHYLENE COMPOSITE FIBRE

This application is the US national phase of international application PCT/EP2005/007816 filed 14 Jul. 2005 which designated the U.S. and claims benefit of EP 04077162.8, dated 27 Jul. 2004, the entire content of which is hereby incorporated by reference.

The invention relates to a process for making a carbon nanotubes/ultra-high molar mass polyethylene composite fibre comprising the steps of a) pre-treating carbon nanotubes with an acidic aqueous solution; b) making a composition containing pre-treated carbon nanotubes dispersed in a solution of UHPE in a spin solvent; and c) spinning the composition obtained into fibres.

The invention also relates to a CNTs/UHPE composite fibre obtainable by the process according to the invention, and to semi-finished or end-use articles containing said composite fibre.

Such a process is known from a publication in Polymer 44 (2003), at pages 5643-5654. In this article a process for making stretched films of ultra-high molar mass polyethylene (UHPE) containing 1 mass % of carbon nanotubes (CNTs) is described wherein multi-walled CNTs were pre-treated by refluxing the CNTs in an aqueous mixture of concentrated nitric and sulphuric acids in a 1/3 ratio; followed by repeatedly washing with distilled water until no acidity resulted. The pre-treated CNTs were then dispersed in xylene with ultrasonic vibration at ambient temperature. The obtained dispersion was subsequently mixed with a UHPE solution in xylene at 140° C. Films were made by solution casting from the CNT/UHPE/xylene mixture, and subsequently hot drawing. It is indicated the process can similarly be applied to gel spinning of UHPE fibres. The films thus made appeared to contain both individually dispersed and entangled arrays of CNTs, and showed improved tensile strength but no effect on tensile modulus versus UHPE films without CNTs.

CN 1431342 A discloses a process for making a CNTs/UHPE composite fibre containing 0.01-5 mass % of CNTs, wherein the carbon nanotubes are first subjected to a pretreatment comprising a step of refluxing CNTs in a mixed aqueous solution of sulphuric acid and potassium permanganate. The pre-treated CNTs are uniformly distributed in paraffin oil containing UHPE while raising the temperature to 150-190° C. and using ultrasound; followed by gel spinning of the mixture into a fibre. An increase in tensile properties is reported versus a fibre not containing CNTs, but the absolute strength level is still rather low (2.2 GPa).

There is an ongoing need in industry, for example for making heavy-duty ropes or light-weight anti-ballistic composites, for UHPE fibres with improved properties, especially with higher tensile strength and modulus.

The object of the invention is therefore to provide a process for making UHPE fibres, especially CNTs/UHPE composite fibres that show better tensile properties than the fibres obtained by the known process. More specifically, the invention aims at providing a process for making CNTs/UHPE composite fibres having a tensile strength of at least 3.0 GPa and a tensile modulus of at least 90 GPa.

This object is achieved according to the invention with a process wherein step b) comprises making a dispersion of pre-treated CNTs in an alcohol, and mixing this dispersion with a mixture of UHPE and spin solvent.

With the process according to the invention UHPE composite fibres containing 0.1-10 mass % of CNTs are obtained, which fibres show improved tensile properties, for example having a tensile strength of at least 3.0 GPa and a tensile modulus of at least 90 GPa.

Another advantage of the process according to the invention is that no or hardly any additional components, like dispersion aids, need to be added to make a stable dispersion of CNTs in the spin solvent. A further advantage is that the alcohol may be removed from the composition before the spinning step; thus preventing any negative effect of the alcohol during spinning or further processing.

WO 03/069032 A1 also describes a method to make composite fibres containing CNTs, wherein a colloidal dispersion of CNTs in a first solvent is mixed with a solution of polymer in a second solvent that is miscible with the first solvent, which mixture is spun into a fibre. For making a CNTs dispersion in a UHPE solution, chlorinated hydrocarbons, specifically dichlorobenzene, are mentioned as the first solvent, and use of a surfactant is advised. There is no indication, however, that a process comprising the specific combination of steps of the present application would be advantageous.

A CNTs/UHPE composite fibre is understood to be a fibre based on a UHPE polymer as its main component and containing CNTs as property enhancing additive. Within the context of the present application a fibre is understood to be an elongated body with length dimension much greater than its width and thickness. The term fibre thus includes a monofilament, a multifilament yarn, a ribbon, a strip, a tape, or a film and the like, and can have regular or irregular cross sections.

Suitable ultra-high molar mass polyethylene for use in the process according to the invention has an intrinsic viscosity (IV, as measured on solution in decalin at 135° C.) of typically above 5 dl/g, preferably between about 8 and 40 dl/g, more preferably between 10 and 30, or 12 and 28, or between 15 and 25 dl/g. Intrinsic viscosity is a measure for molar mass (also called molecular weight) that can more easily be determined than actual molar mass parameters like Mn and Mw. There are several empirical relations between IV and Mw, but such relation is highly dependent on molar mass distribution. Based on the equation Mw=$5.37 \times 10^4$ $[IV]^{1.37}$ (see EP 0504954 A1) an IV of 8 dl/g would be equivalent to a Mw of about 930 kg/mol. Preferably, the UHPE is a linear polyethylene with less than one branch or side chain per 100 carbon atoms, and preferably less than one side chain per 300 carbon atoms, a branch usually containing at least 10 carbon atoms. The linear polyethylene may further contain up to 5 mol % of one or more comonomers, such as alkenes like propylene, butene, pentene, 4-methylpentene or octene.

In a preferred embodiment, the UHPE contains a small amount of relatively small groups as side chains, preferably a C1-C4 alkyl group. It is found that a certain amount of such groups results in fibres having improved creep behaviour. Too large a side chain, or too high an amount of side chains, however, negatively affects the processing and especially the drawing behaviour of the filaments. For this reason, the UHPE preferably contains methyl or ethyl side chains, more preferably methyl side chains. The amount of such side chains is preferably at most 20, more preferably at most 10 per 1000 carbon atoms.

The UHPE can be a single polymer grade, but also a mixture of two or more different grades, e.g. differing in IV or molar mass distribution, and/or number of side chains.

The fibre may further contain usual amounts, generally less than 5 mass % of customary additives, such as anti-oxidants, thermal stabilizers, colorants, nucleating agents, flow promoters, etc.; or residual amounts of spin solvent. The fibre may also contain other polymers, preferably polyolefinic polymers, like other polyethylenes, polypropylenes, or their copolymers, including rubbery copolymers like EPDM, EPR, etc. The amount of such other polymer is always lower than the amount of UHPE in the fibre, preferably not more than 30% of the UHPE.

Carbon nanotubes, also simply referred to as nanotubes, are carbon-based molecules having a structure related to that of so-called Buckminsterfullerene (C60) and other fullerenes. Nanotubes have a cylindrical structure and may grow into nearly endless tubes of from 50 nm up to 10 mm in length. The nanotube diameter may be from about 0.5-100 nm. Nanotubes are presently typically made from carbon, but also other atoms may be present. Nanotubes are also evaluated as a reinforcing fibre for polymer composites, or for polymeric fibres, because they have a very high aspect ratio (length-to-diameter ratio), but are still short enough to show enough flowability when incorporated into a polymer matrix. Nanotubes can have only a single-wall structure (single-wall nanotubes, abbreviated as SWNTs), a double-wall structure (DWNTs) or a multi-wall structure (MWNTs), resembling concentric cylinders of several layers. Nanotubes show a strong tendency to form aggregates of up to 1000 nanotubes, for example in the form of branched clusters of roughly parallel arranged tubes, interconnected via individual nanotubes that extend into different clusters. Such aggregates, also referred to as ropes can agglomerate to form a powder or a sheet material. CNTs are generally difficult to disperse in organic solvents, especially in non-polar solvents, because of strong particle interaction in the aggregates. Preparation of nanotubes and their properties and potential applications have been subject of numerous publications, see for example WO 97/09272 A1 and WO 98/39250 A1.

A suitable content of CNTs for improving UHPE fibre properties is from about 0.1 to 10 mass %. Probably as a result of the good dispersion obtained with the process according to the invention, a relatively low loading with CNTs already results in markedly improved performance of the fibre. Preferably, therefore, in the process according to the invention the fibre contains 0.2-5 mass % of CNTs, more preferably 0.3-3 or 0.5-2.5 mass %.

The process according to the invention comprises a step of pre-treating carbon nanotubes with an acidic aqueous solution. Suitable pre-treatments include the processes applied in Polymer 44 (2003), p. 5643-5654 or in CN 1431342 A. Preferably, a pre-treating step comprising refluxing the CNTs in an aqueous mixture of concentrated nitric acid (68%) and concentrated sulphuric acid (98%), preferably of about 1/3 volume ratio, is applied; as described in more detail in for example Carbon 36 (1998), p. 1603-1612. This procedure results in well-purified CNTs that can be readily dispersed in aqueous medium. As part of the pre-treatment step the CNTs are generally washed with water to remove residual acid residues. After washing the pre-treated CNTs may be dried; but it is preferred that the CNTs are not fully dried, because the inventors observed this to hamper subsequent dispersion in the alcohol. Preferably, therefore, the alcohol replaces water. Such a solvent switch from aqueous solution to alcohol can for example by made by including final washing steps with the alcohol.

The process according to the invention can be very advantageously applied to multi-wall CNTs (MWNTs), which otherwise generally show relatively low efficiency in improving performance of a composite; as is also observed for the tensile properties of CNTs/UHPE fibres.

The process according to the invention typically results in CNTs having a diameter of at most 50 nm and a length in the range 0.1-5 micron. In preferred embodiments the CNTs have a diameter of at most 40, 30, 25 or even at most 20 nm, and a length of about 0.5-2 micron; as measured on the dispersion in alcohol or on the composite fibre by (electron) microscopy. A lower diameter and higher aspect ratio result in more efficient improvement in tensile properties of the fibre.

The process according to the invention comprises a step of making a composition containing pre-treated carbon nanotubes dispersed in a solution of UHPE in a spin solvent, comprising making a dispersion of pre-treated CNTs in an alcohol, and mixing this dispersion with a mixture of UHPE and spin solvent.

Suitable alcohols for use in the process according to the invention are, at least to some extent, miscible with or soluble in both water and the spin solvent. Solubility in water allows a solvent switch during washing, whereas the extent of solubility in the spin solvent depends a.o. on the desired concentration of CNTs in the alcohol and in the CNTs/UHPE/spin solvent composition. The skilled person can determine suitable solubilities with some simple experiments. Examples of suitable alcohols include aliphatic monohydric alcohols with straight or branched chains, like methanol, ethanol, 1-propanol, 2-propanol, 1-butanol, 1-hexanol, 1-decanol; but also polyhydroxy alcohols like ethylene glycol, etc. Also aromatic alcohols, like phenols, can be used, as long as they show the indicated solubility. Preferably, aliphatic alcohols are used, since they pose no toxicity or other environmental problems. More preferably, C2-C12 aliphatic monohydric alcohols are applied; in view of favourable CNTs dispersion and miscibility with spin solvent.

Making a dispersion of pre-treated CNTs in the alcohol can be done in known manners; e.g. by stirring the mixture, optionally with sonication, during a certain time; e.g. of up to 1 or 2 hours. As indicated above, making the dispersion is more efficient if a solvent switch is made without completely drying the CNTs after the pre-treatment step. Depending on the boiling point of the alcohol used, dispersing can be done at room temperature or at elevated temperatures.

The obtained dispersion of CNTs in alcohol is subsequently mixed with a mixture of UHPE and spin solvent. This mixture can be a solution of UHPE, to result directly in a composition containing pre-treated carbon nanotubes dispersed in a solution of UHPE in a spin solvent. In that case the temperature of the mixture is generally above the dissolution temperature of the UHPE in the spin solvent. Alternatively, the mixture is a dispersion of UHPE particles, for example of UHPE powder as commercially available, in the spin solvent at a temperature below the dissolution temperature. A composition containing pre-treated carbon nanotubes dispersed in a solution of UHPE in a spin solvent is then subsequently made by increasing the temperature to the dissolution temperature while stirring the mixture; optionally with sonication.

Suitable spin solvents are those solvents in which the high molar mass polyethylene can be completely dissolved, optionally at elevated temperature, but below the boiling point of the spin solvent. Preferably, a spin solvent is chosen that results in a homogeneous solution of UHPE at elevated temperature, but which solution solidifies or gels upon lowering the temperature again. Examples of such solvents include solvents like paraffin oil or wax, decalin (or decahydronaphthalene), tetralin, xylene, various kerosines, etc; and are known to the person skilled in the art.

The dispersion of CNTs in alcohol and the spin solvent preferably contain such a low amount of water that the water content of the composition after mixing remains below 500 ppm; more preferably below 200 or even below 100 ppm. Such a low water amount has a positive effect on spinning stability.

The subsequent step in the process according to the invention is solution spinning the composition obtained into fibres. Such spinning processes are also well known to the person skilled in the art. A preferred solution spinning process is the so-called gel spinning process, which is described in numerous publications, including EP 0205960 A, EP 0213208 A1, U.S. Pat. No. 4,413,110, GB 2042414 A, EP 0200547 B1, EP 0472114 B1, WO 01/73173 A1, and Advanced Fiber Spinning Technology, Ed. T. Nakajima, Woodhead Publ. Ltd (1994), ISBN 1-855-73182-7, and references cited therein. Gel spinning is understood to include at least the steps of spinning at least one filament from a solution of ultra-high molecular weight polyethylene in a spin solvent; cooling the filament obtained to form a gel filament; removing at least partly the spin solvent from the gel filament; and drawing the filament in at least one drawing step before, during and/or after removing spin solvent. In a preferred embodiment the composite fibre made is a multi-filament yarn.

During gel spinning, a constant solvent composition is important for maintaining a constant and stable spin process, and obtaining fibres of constant quality. If the alcohol in the composition has a relatively low boiling point, i.e. below the boiling point of the spin solvent, the alcohol is preferably removed from the composition before spinning. The process according to the invention therefore preferably further comprises a step wherein the alcohol is removed from the composition before step c), for example by evaporation. A further advantage of removing the alcohol before spinning is that recovery and purification of the spin solvent is not influenced by the presence of the alcohol. For enabling such removal of alcohol, the alcohol preferably has a boiling point of below 180° C., more preferably of below 150, 125, or even below 100° C.

In a specifically preferred embodiment, ethanol is used as the alcohol, because this enables good dispersion of CNTs and easy removal from the composition by evaporating from the mixture at for example 40 to 80° C., which mixture can be both a dispersion or a solution of UHPE in spin solvent, and it allows making CNTs/UHPE fibres with high tensile properties.

In another embodiment, a composition comprising an alcohol having a relatively high boiling point; that is preferably above 180° C., more preferably above 200 or 220° C. is used. The advantage thereof is that the spin process remains stable, probably because of a constant spin composition, without an alcohol removal step being applied. An example of a suitable high boiling point alcohol is 1-decanol. Such an alcohol is preferably removed from the fibre, together with spin solvent, by an extraction process.

The process according to the invention may further comprise a step of deforming the fibres in transverse direction after gel filaments have been formed, i.e. is in a gel state or solid state. In the gel state the fibres can still contain relatively high amounts of solvent, but are in a semi-solid state. The fibres are in solid state after the spin solvent has been substantially removed. Spin solvent being substantially removed is understood to mean that the fibres contain at most 5 mass % of residual spin solvent.

Deforming the fibres in transverse direction, that is about perpendicular to the drawing direction in the gel state or solid state, is found to result in improved drawing behaviour of the fibres, i.e. a higher allowable drawing ratio without fibre breakage; resulting in higher tensile properties. Without wishing to be bound to any theory, the inventors believe this may be due to further improving the dispersion of CNTs in the fibre, e.g. by disrupting aggregates. Such deformation step can for example be performed by passing the fibres between two rollers kept at a certain distance.

The invention further relates to a UHPE composite fibre containing 0.1-10 mass % of CNTs, which fibres have a tensile strength of at least 3.0 GPa and a tensile modulus of at least 90 GPa, and which fibres are obtainable by the process according to the invention.

The fibre according to the invention already shows improved tensile properties at relatively low loading of CNTs, and thus preferably contains 0.2-5, 0.3-3, or even 0.5-2.5 mass % of CNTs.

Preferably, the fibre according to the invention has tensile strength and modulus of at least 3.1 and 95 GPa, respectively; more preferably of at least 3.2 and 100 GPa; or even 3.5 and 110 GPa. In addition, such fibres show surprisingly improved resistance to cutting by a sharp object, like a knife.

The invention further relates to various semi-finished and end-use articles containing the composite fibre according to the invention, or such fibre obtainable by the process according to the invention. Examples of such articles include various ropes and cords, fishing nets, sports equipment, medical applications, cut-resistant articles, and ballistic-resistant composites. In most of these applications the tensile strength of the yarn is an essential parameter determining the performance of the article.

Ropes especially include heavy-duty ropes for application in marine and offshore operations, like anchor handling, seismic operations, mooring of drilling rigs and production platforms, and towing.

Cut-resistant articles, like for example protective gloves, are typically made from the composite fibre according to the invention and optionally other fibres by knitting techniques.

Ballistic-resistant composites specifically include multi-layered assemblies containing a plurality of layers comprising the fibre according to the invention, and to ballistic-resistant articles comprising such an assembly. The composite fibre can be present in various forms in a layer, including woven and non-woven fabrics. Preferably, the layers contain uni-directionally oriented fibres; with the fibre direction in each layer being rotated with respect to the fibre direction in an adjacent layer. The fibre layers may further comprise a binder material, basically to hold the filaments in the layer together.

The invention further relates to a process of making a dispersion of carbon nanotubes in a non-polar medium, comprising the steps of pre-treating CNTs with an acidic aqueous solution; making a dispersion of pre-treated CNTs in an alcohol, and mixing this dispersion with a non-polar solvent. A non-polar solvent is understood to be a solvent that can homogeneously dissolve a polyolefin, like a polyethylene, polypropylene, or any other non-crosslinked copolymer substantially consisting of ethylene, propylene and/or another alpha-olefin, optionally at elevated temperature; and includes but is not limited to a spin solvent for UHPE. A non-polar medium is for example a non-polar solvent, or a solution of a polyolefin in such solvent, optionally containing other components like typical additives for a polyolefin. This process according to the invention allows making a stable CNTs dispersion in a non-polar medium without the need of adding dispersing aids like surfactants or other additives. The resulting CNTs dispersion can be advantageously used for various purposes, like making of composite products such as coatings, films, fibres and the like. Depending on the content of CNTs in the dispersion, and the ratio CNTs/polyolefin in e.g. a composite product after removing the non-polar solvent, the composite product shows improved properties over products of similar composition but made via known methods; like improved mechanical properties, or improved electrical properties. Preferred embodiments for this process of making a CNTs dispersion are analogous to the embodiments and preferences described earlier for the process of making a CNTS/UHPE composite fibre.

The invention further relates to a dispersion of carbon nanotubes in a non-polar medium, especially to a dispersion of CNTs in a solution of a polyolefin in a non-polar solvent, obtainable by the process according to the invention.

The invention further relates to the use of said dispersion of carbon nanotubes in a non-polar medium, especially a solution of a polyolefin in a non-polar solvent, according to the invention for making composite products such as coatings, films, fibres and the like.

The invention will be further elucidated with reference to the following experiments.

EXAMPLE 1

Multi-walled CNTs were obtained from Carbon Nanotech Point (Shenzhen, China). 1 gram of CNTs was dispersed into 100 ml of an acid mixture of H2SO4 (98%) and HNO3 (68%) in a 3:1 volume ratio. The mixture is heated at 90° C. with magnetical stirring during about 1.5 hours, and was subsequently allowed to cool down. After that, de-ionized water was added to the acidic mixture, and then filtered over a quartz filter of pore size 1.0 μm. This dilution/filtering procedure was carried out 2 times, after which the CNTs were again diluted in de-ionized water and treated in an ultrasonic bath at room temperature for about 10-20 minutes. The resulting dispersion was again filtered. This sonication/filtering procedure was repeated until the water was colourless or the pH neutral.

After the final filtering step, some of the CNTs was dried overnight in a vacuum-oven at 60° C. to determine the yield and solids content (typically about 70-80 mass % overall yield). The moist CNTs were washed with ethanol and then dispersed in ethanol (0.15 g CNTs in 50 ml of analytical grade ethanol) at room temperature and with sonication during 80 minutes.

15 g powdery UHPE polymer having less than 0.3 side groups per 1000 per carbon atoms and an IV of 19.8 dl/g in decalin, was brought into 500 ml decalin (containing a ratio of cis/trans isomers of 40/60, and a water content below 100 ppm) at room temperature, and the mixture was sonicated in a bath for 75 minutes; then the dispersion of CNTs in ethanol was added to the UHPE/decalin suspension and the resulting mixture was sonicated for another 30 minutes. Subsequently, the resulting mixture was magnetically stirred on a hot-plate at a temperature between 50 and 60° C. in order to evaporate the ethanol in about 45 minutes.

Fibres were spun by the so-called gel-spinning technology. The CNTs/UHPE/decalin composition was fed with a hose-pump into an APV twin-screw extruder (D=19 mm, length 25 D, 5 heating zones) operated at typically 175° C. and 300 rpm. In the extruder the UHPE was dissolved in decalin. Directly after the extruder, a spinning gear pump of 0.3 cc was set at 60 rpm to extrude the spinning solution through a spinneret with a diameter of 2 mm. About 10 cm under the spinneret a water bath (about 50 cm deep) was placed and the spun filament was led directly to the bottom of the bath, and guided over a free-rolling wheel to the take-up roll equipped with a bobbin. The speed of the take-up roll was set so that the draw ratio in the air-gap was about 8.4. Spun filaments were dried on the bobbin under ambient conditions.

A bobbin with dried as-spun filament containing 1 mass % of CNTs was placed on a feed roll and the filament was led through an electrically heated tubular oven of 90 cm length, and wound on another bobbin on the take-off roll. The draw ratio applied is the ratio of the speeds of the take-off roll and the feed roll. The fibre was drawn 15 to 20 times in two steps; first with a draw ratio of 5 at 130° C. (feed velocity 0.5 cm/s), and then with a draw ratio of 3 to 4 at 140° C. (feed velocity 0.13 cm/s).

Tensile properties; tensile strength (or strength), tensile modulus (or modulus) and elongation at break (or eab) were determined on fibre samples with an effective sample length of 278 mm (200 mm distance between clamps plus 78 mm filament on the curved clamp surfaces) and a crosshead speed of 100 mm/min, using a Zwick/Roell Z010 tensile tester with Zwick 8190 pneumatic clamps (based on standard ASTM D885M). On the basis of the measured stress-strain curve the modulus at 0.3% strain was determined (by fitting between 0.25 and 0.35% strain). For calculation of the modulus and strength, the tensile forces measured were divided by the fibre linear density, as determined by weighing 1 meter length of fibre on a micro-balance before and after a series of 3 individual tensile tests; values in GPa are calculated assuming a density of 0.97 g/cm$^3$. In total, at least 12 tests were performed. The averaged results are presented in Table 1.

Intrinsic viscosity (IV) of UHPE was determined according to method PTC-179 (Hercules Inc. Rev. Apr. 29, 1982) at 135° C. in decalin, with a dissolution time of 16 hours, using DBPC as anti-oxidant in an amount of 2 g/l solution, and by extrapolating the viscosity as measured at different concentrations to zero concentration (following ASTM D4020).

The number of side chains in a UHPE sample was determined by FTIR on a 2 mm thick compression moulded film, by quantifying the absorption at 1375 cm$^{-1}$ using a calibration curve based on NMR measurements (as in e.g. EP 0269151).

Comparative Experiments A-C.

Analogously to Example 1, a UHPE solution in decalin was made but without CNTs, and spun into a fibre (experiment A). In experiment B the CNTs were used as received and added to a mixture of UHPE powder in decalin as in Example 1 (1 mass % on UHPE), and analogously spun into a fibre. In experiment C the CNTs are pre-treated with the acidic solution, washed with water and dried, and subsequently used to make a mixture with UHPE and decalin as in Example 1.

The data listed in Table 1 indicate that the best properties are obtained in Example 1, with a process including pre-treatment with an aqueous acidic solution, followed by dispersing the CNTs in alcohol.

EXAMPLE 2

Analogously to Example 1, a UHPE solution in decalin was made but with 5 mass % CNTs, and spun into a fibre. At a draw ratio of 17.5, the resulting fibre already showed a slight increase in strength over the reference fibre made with draw ratio 20 (Comp. Ex. A).

EXAMPLE 3

The as-spun precursor fibre as made in Example 2, which was still undrawn, was subjected to an additional deformation step; by compressing a length of fibre in a platen press at 120° C. during 30 minutes. The fibre was subsequently drawn in a tensile tester equipped with an oven; first 5 times at a temperature of 120° C., followed by additional 6 times at 130° C.

Tensile properties were subsequently determined at room temperature and with an elongation rate of 2.54 mm/min.

Comparative Experiment D

The as-spun precursor fibre as made in Comp. Exp. A, which was still undrawn, was subjected to an additional deformation step, and subsequent drawing and testing as described for Ex. 3. Results are given in Table 1.

It can be concluded that incorporating a step wherein the fibre is deformed in the transverse fibre direction, results in a higher drawability of the fibres; and further improvement of tensile behaviour. The presence of CNTs in the fibre made with above process, results in even better properties.

TABLE 1

| Experiment | Tensile properties | | | |
|---|---|---|---|---|
| | Strength (GPa) | Modulus (GPa) | eab (%) | Linear density (dtex) |
| Example 1 | 3.1 | 97 | 4.4 | 7.6 |
| Comp. Exp. A | 2.8 | 86 | 4.4 | 7.5 |
| Comp. Exp. B | 2.5 | 81 | 4.0 | 7.7 |
| Comp. Exp. C | 2.9 | 87 | 4.3 | 7.6 |
| Example 2 | 2.9 | 94 | 3.8 | 7.6 |
| Example 3 | 4.2 | 137 | 4.2 | 4.4 |
| Comp. Exp. D | 3.5 | 123 | 4.0 | 5.0 |

The invention claimed is:

1. A process for making a carbon nanotubes/ultra-high molar mass polyethylene composite fibre comprising the steps of:
   a) pre-treating carbon nanotubes (CNTs) with an acidic aqueous solution to form pre-treated CNTs;
   b) forming a dispersion of the pre-treated CNTs in an aliphatic alcohol;
   c) forming a gel spinning dope by mixing the dispersion of the pre-treated CNTs in the aliphatic alcohol with a solution comprised of ultra-high molar mass polyethylene (UHPE) in a spin solvent; and
   d) spinning the gel spinning dope obtained in step c) into fibres.

2. Process according to claim 1, wherein the fibre contains 0.2-5 mass % of CNTs.

3. Process according to claim 1, wherein step a) comprises refluxing the CNTs in an aqueous mixture of concentrated nitric acid (68%) and concentrated sulphuric acid (98%).

4. Process according to claim 1, wherein the CNTs comprise multi-wall CNTs.

5. Process according to claim 1, wherein the CNTs have a diameter of at most 50 nm.

6. Process according to claim 1, further comprising a step of removing the alcohol from the composition before step d).

7. Process according to claim 6, wherein the alcohol has a boiling point of below 150° C.

8. Process according to claim 1, wherein the alcohol is ethanol.

9. Process according to claim 1, further comprising a step of deforming the fibres in a transverse direction in a gel state or solid state.

10. A process for making a fiber gel spinning dope comprising:
   (i) pre-treating carbon nanotubes (CNTs) with an acidic aqueous solution to form pre-treated CNTs;
   (ii) dispersing the pre-treated CNTs in an aliphatic alcohol to form an alcoholic dispersion of the CNTs; and
   (iii) forming a gel spinning dope by mixing the alcoholic dispersion of CNTs with a solution comprised of ultra-high molar mass polyethylene (UHPE) in a spin solvent.

11. Process according to claim 10, wherein the spin solvent is a non-polar solvent.

12. Process according to claim 3, wherein the aqueous mixture comprises a volume ratio of the concentrated nitric acid to the concentrated sulphuric acid of 1/3.

13. Process according to claim 1, which comprises removing the aliphatic alcohol from the spin dope by evaporation prior to step d), and wherein step d) comprises at least partly removing the spin solvent.

14. Process according to claim 13, further comprising drawing the fibre before, during or after at least partly removing the spin solvent.

* * * * *